(12) United States Patent
King et al.

(10) Patent No.: US 8,754,922 B2
(45) Date of Patent: Jun. 17, 2014

(54) SUPPORTING MULTIPLE VIDEOCONFERENCING STREAMS IN A VIDEOCONFERENCE

(75) Inventors: Keith C. King, Austin, TX (US); Stefan F. Slivinski, Austin, TX (US); Ashish Goyal, Bangalore (IN)

(73) Assignee: LifeSize Communications, Inc., Austin, TX (US)

( * ) Notice: Subject to any disclaimer, the term of this patent is extended or adjusted under 35 U.S.C. 154(b) by 348 days.

(21) Appl. No.: 12/890,231

(22) Filed: Sep. 24, 2010

(65) Prior Publication Data

US 2011/0074910 A1    Mar. 31, 2011

Related U.S. Application Data

(60) Provisional application No. 61/246,401, filed on Sep. 28, 2009.

(51) Int. Cl.
*H04N 7/14* (2006.01)

(52) U.S. Cl.
USPC ..................... 348/14.01; 709/204

(58) Field of Classification Search
USPC ....................................... 348/14.01
See application file for complete search history.

(56) References Cited

U.S. PATENT DOCUMENTS

| | | | |
|---|---|---|---|
| 5,488,570 A * | 1/1996 | Agarwal | 345/501 |
| 7,356,080 B2 | 4/2008 | Lee et al. | |
| 7,388,913 B1 | 6/2008 | Christopoulos et al. | |
| 7,453,488 B2 * | 11/2008 | Parker et al. | 348/14.08 |
| 7,454,692 B2 | 11/2008 | Bhaskaran | |
| 7,627,629 B1 * | 12/2009 | Wu et al. | 709/204 |
| 7,692,683 B2 | 4/2010 | Kenoyer et al. | |
| 2003/0197785 A1 * | 10/2003 | White et al. | 348/207.99 |
| 2004/0119814 A1 * | 6/2004 | Clisham et al. | 348/14.08 |
| 2005/0078170 A1 * | 4/2005 | Firestone et al. | 348/14.08 |
| 2006/0037052 A1 * | 2/2006 | McDowell et al. | 725/80 |
| 2006/0087553 A1 | 4/2006 | Kenoyer et al. | |
| 2006/0158509 A1 | 7/2006 | Kenoyer et al. | |
| 2006/0248210 A1 | 11/2006 | Kenoyer et al. | |
| 2008/0316295 A1 | 12/2008 | King et al. | |
| 2008/0316297 A1 * | 12/2008 | King et al. | 348/14.09 |
| 2010/0225736 A1 | 9/2010 | King et al. | |
| 2010/0231556 A1 * | 9/2010 | Mines et al. | 345/178 |
| 2012/0262531 A1 * | 10/2012 | Sylvain | 348/14.01 |

* cited by examiner

*Primary Examiner* — Maria El-Zoobi

(74) *Attorney, Agent, or Firm* — Meyertons Hood Kivlin Kowert & Goetzel, P.C.; Jeffrey C. Hood; Joel L. Stevens

(57) ABSTRACT

Supporting a plurality of videoconferencing streams in a videoconference. The method may include receiving the plurality of videoconferencing streams and may include decoding a first videoconferencing stream of the plurality of videoconferencing streams. The method may also include selecting, for decoding, a second videoconferencing stream of the plurality of videoconferencing streams. The second videoconferencing stream may not be the first videoconferencing stream. The method may further include decoding, in response to said selecting, the second videoconferencing stream of the plurality of videoconferencing streams.

15 Claims, 4 Drawing Sheets

SUPPORTING MULTIPLE VIDEOCONFERENCING STREAMS IN A VIDEOCONFERENCE

PRIORITY DATA

This application claims benefit of priority of U.S. provisional application Ser. No. 61/246,401 titled "Supporting Multiple Videoconferencing Streams in a Videoconference" filed Sep. 28, 2009, whose inventors were Keith C. King, Stefan Slivinski, and Ashish Goyal, which is hereby incorporated by reference in its entirety as though fully and completely set forth herein.

FIELD OF THE INVENTION

The present invention relates generally to videoconferencing and, more specifically, to a method for supporting multiple videoconferencing streams in a videoconference.

DESCRIPTION OF THE RELATED ART

Videoconferencing may be used to allow two or more participants at remote locations to communicate using both video and audio. Each participant location may include a videoconferencing system for video/audio communication with other participants. Each videoconferencing system may include a camera and microphone to collect video and audio from a first or local participant to send to other (remote) participant(s). Each videoconferencing system may also include a display and speaker(s) to reproduce video and audio received from one or more remote participants. Each videoconferencing system may also be coupled to (or comprise) a computer system to allow additional functionality into the videoconference. For example, additional functionality may include data conferencing (including displaying and/or modifying a document for both participants during the conference). In some videoconferencing systems a computer (e.g., a personal computer (PC)) may be connected to videoconferencing equipment and used for a variety of purposes (e.g., for displaying and/or modifying documents).

Similarly, audioconferencing (e.g., teleconferencing) may allow two or more participants at remote locations to communicate using audio. For example, a speakerphone may be placed in a conference room at one location, thereby allowing any users in the conference room to participate in the audioconference with another set of user(s) (e.g., in another conference room with a speakerphone).

The falling cost of electronics components has allowed technology that was once limited to products for wealthy individuals and sizable corporations (e.g., computers, mobile phones, etc.) to expand into other markets (e.g., the consumer market, the small business market, etc.). However, other markets may be more cost sensitive and new approaches may be required to deliver a desirable set of features at a certain price point. The ability to handle multiple videoconferencing streams may be considered a desirable feature for some videoconferencing products especially in a cost effective manner. Accordingly, improvements in videoconferencing are desired.

SUMMARY OF THE INVENTION

Various embodiments are presented of a system and method for supporting multiple videoconferencing streams in a videoconference.

The method may include receiving a plurality of videoconferencing streams and decoding a first videoconferencing stream of those streams. The decoded videoconferencing stream may be provided for display.

Additionally, a second, different videoconferencing stream may be selected, (e.g., in response to user input). The selection of the second videoconferencing stream may be performed while the first videoconferencing stream is displayed. Accordingly, in response to the selection, the second videoconferencing stream may be decoded.

Thus, in one embodiment, the decoding may be performed in response to user input selecting the second videoconferencing stream. The user input may be received in response to displaying videoconferencing stream decoding options (e.g., in a graphical user interface), which may be provided via a variety of mechanisms. For example, the options may be provided on a handheld device (such as a mobile device), a personal computer, and/or a videoconference display, among other possibilities. Additionally, the user input, e.g., selecting one of the options, may be received via any number of devices, e.g., via a user input device, such as, for example, a remote control device, a computer, a keyboard (e.g., of the videoconferencing system), a keypad device or a pointing device, a GUI provided on a mobile device (e.g., via a touch screen), among other possibilities.

BRIEF DESCRIPTION OF THE DRAWINGS

A better understanding of the present invention may be obtained when the following detailed description is considered in conjunction with the following drawings, in which.

Figure 1:
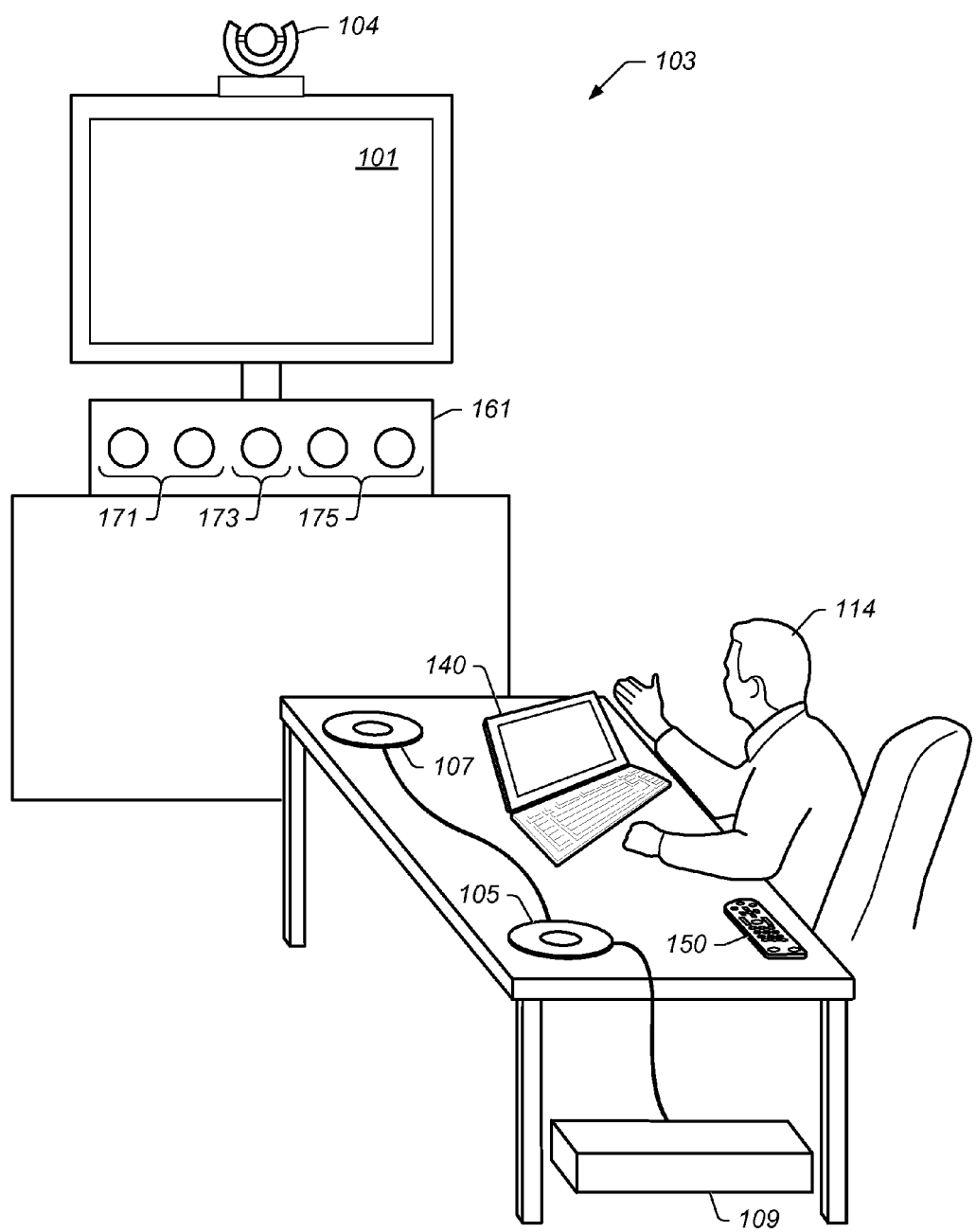
FIG. 1 illustrates an exemplary videoconferencing system participant location, according to one or more embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note that the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF THE EMBODIMENTS

Incorporation by Reference

U.S. patent application titled "Video Conferencing System Transcoder", Ser. No. 11/252,238, which was filed Oct. 17, 2005, whose inventors are Michael L. Kenoyer and Michael V. Jenkins, is hereby incorporated by reference in its entirety as though fully and completely set forth herein.

FIG. 1—Exemplary Participant Location

FIG. 1 illustrates an exemplary embodiment of a videoconferencing participant location, also referred to as a videoconferencing endpoint or a videoconferencing system (or videoconferencing unit). Videoconferencing system 103 may include system unit 109, e.g., a videoconferencing codec (e.g., a coder-decoder). Note, however, that videoconferencing system unit 109 may provide various other functions, including, for example, non-codec functions. However, for reasons of brevity, videoconferencing system unit 109 may be hereafter referred to as codec 109. In some embodiments, codec 109 may manage both a speakerphone 105/107 and videoconferencing hardware, e.g., camera 104, display 101, speakers 171, 173, 175, etc. The speakerphones 105/107 and other videoconferencing system components may be coupled to the codec 109 and may receive audio and/or video signals from the codec 109.

In some embodiments, the participant location may include camera 104 (e.g., an HD camera) for acquiring images (e.g., of participant 114) of the participant location. Other cameras are also contemplated. The participant location may also include display 101 (e.g., an HDTV display). Images acquired by the camera 104 may be displayed locally on the display 101 and/or may be encoded and transmitted to other participant locations in the videoconference.

The participant location may further include one or more input devices, such as a keyboard (not shown) or a mouse (not shown). In some embodiments, the one or more input devices may be used for the videoconferencing system 103 and/or may be used for one or more other computer systems at the participant location, as desired.

In some embodiments, the participant location may also include a computer system 140 (e.g., a PC). The computer system 140 may be used for multiple purposes (e.g., viewing and modifying documents for data conferencing). The computer system 140 may be of various types (e.g., desktop computer, laptop computer, net-book, server, workstation) and it may run a variety of operating systems (e.g., Microsoft Windows®, Mac OS®, Linux®, Solaris™). The computer system 140 may also be able to provide (e.g., through software applications running on the computer system) functions that may be beneficial to the video conferencing system. For example, the computer system 140 may be able to offload tasks that may otherwise be performed by videoconferencing equipment (e.g., codec 109). Also, through the use of software running on the computer system, the process of transmitting data may be performed in a more beneficial manner (e.g., data may be converted for transmission and transmitted using different techniques). Furthermore, the computer system 140 may connect to videoconferencing equipment in a number of ways (e.g., through a wired connection, through a wired network connection, through a wireless peer-to-peer connection, through a wireless infrastructure connection).

The participant location may also include a sound system 161. The sound system 161 may include multiple speakers including left speakers 171, center speaker 173, and right speakers 175. Other numbers of speakers and other speaker configurations may also be used. The videoconferencing system 103 may also use one or more speakerphones 105/107 which may be daisy chained together.

In some embodiments, the videoconferencing system components (e.g., the camera 104, display 101, sound system 161, and speakerphones 105/107) may be coupled to codec 109. Codec 109 may be placed on a desk or on a floor. Other placements are also contemplated. System codec 109 may receive audio and/or video data from a network, such as a LAN (local area network) or the Internet. The system codec 109 may send the audio to the speakerphone 105/107 and/or sound system 161 and the video to the display 101. The received video may be HD video that is displayed on the HD display. Codec 109 may also receive video data from camera 104 (and PC 140) and audio data from the speakerphones 105/107 and transmit the video and/or audio data over the network to another conferencing system. The conferencing system may be controlled by a participant or user through the user input components (e.g., buttons) on the speakerphones 105/107 and/or input devices such as the keyboard (not shown) and/or PC 140 and/or remote control 150. Other system interfaces may also be used.

In various embodiments, a codec may implement a real time transmission protocol. In some embodiments, a codec (which may be short for "compressor/decompressor") may comprise any system and/or method for encoding and/or decoding (e.g., compressing and decompressing) data (e.g., audio and/or video data). For example, communication applications may use codecs for encoding video and audio for transmission across networks, including compression and packetization. Codecs may also be used to convert an analog signal to a digital signal for transmitting over various digital networks (e.g., network, PSTN, the Internet, etc.) and to convert a received digital signal to an analog signal. In various embodiments, codecs may be implemented in software, hardware, or a combination of both. Some codecs for computer video and/or audio may include MPEG, Indeo™, and Cinepak™, among others.

In some embodiments, codec 109 may receive multiple videoconferencing streams (e.g., streams from multiple sources, multiple streams from a single source, remote streams and local streams, audio streams, video streams and data streams). In some embodiments, there may be fewer stream decoders than there are videoconferencing streams available for decode (e.g., received at the codec). For example, in certain codecs (e.g. codec 109), there may be only one decoder (e.g., for technical reasons or for system cost reasons) and there may two or more videostreams available for decoding (e.g., being received at the codec). In some embodiments, a videoconference participant (e.g., participant 114) may employ a user input device (e.g., laptop 140, remote control 150, a keypad, a mouse, a pointer device) to select one of the video streams available for decoding. This user selection action may result in a codec (e.g., codec 109) stopping the decode of a previously selected (or default) videoconferencing stream and starting the decode of the currently selected videoconferencing stream, as described in more detail below. In addition, videoconferencing display (e.g., videoconferencing display 101) may stop displaying a previously selected (and decoded) videoconferencing stream and may start displaying the currently selected (and decoded) videoconferencing stream. Furthermore, a sound system (e.g., sound system 161) may stop outputting audio associated with a previously selected videoconferencing stream and start outputting audio associated with the currently selected videoconferencing stream. Alternatively, where the second videoconferencing stream has no audio (e.g., where the second videoconferencing stream corresponds to dataconferencing from a computer system) or where the user wishes to continue to hear audio from the first videoconferencing stream, the audio may correspond to a previous or default videoconferencing stream rather than the currently selected or decoded videoconferencing stream.

In some embodiments, the videoconferencing system 103 may be designed to operate with normal display or high definition (HD) display capabilities. The videoconferencing system 103 may operate with various network infrastructures that may include, for example, network infrastructures that support T1 capabilities or less (e.g., 1.5 mega-bits per second or less, and 2 mega-bits per second or more, etc.). Note that these network infrastructures are purely exemplary and are not intended to be limiting in any way. Those familiar with the art will appreciate that some embodiments may operate with network infrastructures that have greater capabilities and that other embodiments may operate with network infrastructures have lesser capabilities.

Note that the videoconferencing system(s) described herein may be dedicated videoconferencing systems (i.e., whose purpose is to provide videoconferencing) or general purpose computers (e.g., IBM-compatible PC, Mac, etc.) executing videoconferencing software (e.g., a general purpose computer for using user applications, one of which performs videoconferencing). A dedicated videoconferencing system may be designed specifically for videoconferencing, and is not used as a general purpose computing platform; for example, the dedicated videoconferencing system may execute an operating system which may be typically streamlined (or "locked down") to run one or more applications to provide videoconferencing, e.g., for a conference room of a company. In other embodiments, the videoconferencing system may be a general use computer (e.g., a typical computer system which may be used by the general public or a high end computer system used by corporations) which can execute a plurality of third party applications, one of which provides videoconferencing capabilities. Videoconferencing systems may be complex (such as the videoconferencing system shown in FIG. 1) or simple (e.g., a user computer system with a video camera, input devices, microphone and/or speakers). Thus, references to videoconferencing systems, endpoints, etc. herein may refer to general computer systems which execute videoconferencing applications or dedicated videoconferencing systems. Note further that references to the videoconferencing systems performing actions may refer to the videoconferencing application(s) executed by the videoconferencing systems performing the actions (i.e., being executed to perform the actions).

The videoconferencing system 103 may execute various videoconferencing application software that presents a GUI on the display 101. The GUI may be used to present an address book, contact list, list of previous callees (call list) and/or other information indicating other videoconferencing systems that the user may desire to call to conduct a videoconference.

Note that the videoconferencing system shown in FIG. 1 may be modified to be an audioconferencing system. The audioconferencing system, for example, may simply include speakerphones 105/107, although additional components may also be present. Additionally, note that any reference to a "conferencing system" or "conferencing systems" may refer to videoconferencing systems or audioconferencing systems (e.g., teleconferencing systems).

Figure 2:
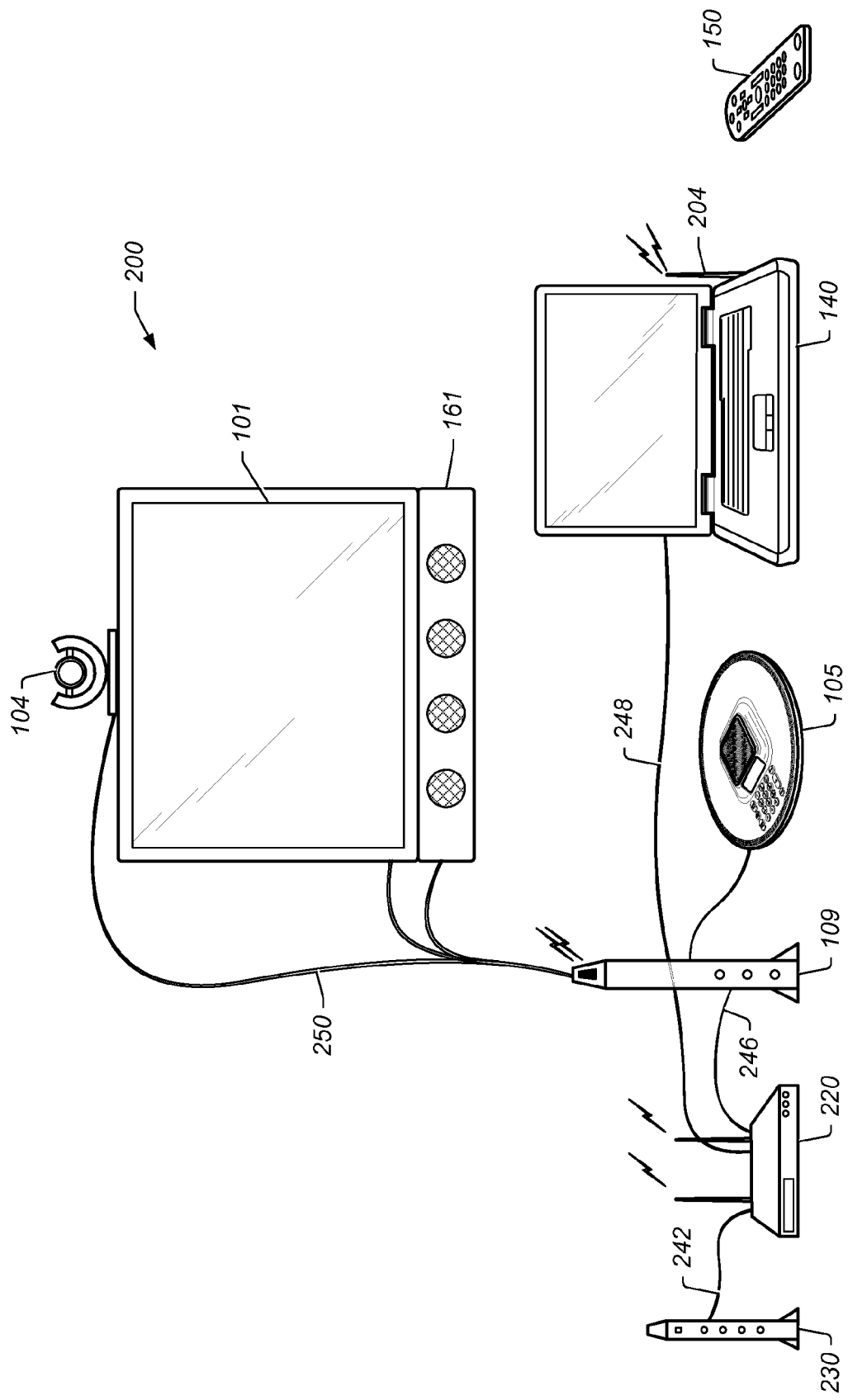
FIG. 2 depicts various components of an exemplary conferencing system, according to one or more embodiments.

FIG. 2—Exemplary Videoconferencing Components

FIG. 2 depicts an exemplary videoconferencing system 200 according to one or more embodiments. In FIG. 2 videoconferencing components and wired connections between the components are depicted. Videoconferencing system 200 includes many of the same components found in system 103. For example, system 200 includes the computer system 140, codec 109, speakerphone 105, camera 104, remote control 150, display 101 and sound system 161. Since these components (and their uses) have already been described in text accompanying FIG. 1, other aspects of system 200 will now been addressed.

System 200 may include network router 220, which may be a wireless router or a wired router or a wireless/wired router (as depicted). Router 220 may connect to codec 109 by cable 246 and to the computer system 140 by cable 248. If router 220 is a wireless/wired router, then router 220 may, for example, connect to the computer system 140 by a wired link or by a wireless link and router 220 may, for example, connect to codec 109 by a wired link or by a wireless link.

Router 220 may also connect to modem 230 (e.g., through cable 242) which may enable videoconferencing system 200 to connect to the Internet and/or an intranet and/or an extranet. Modem 230 may be, for example, an asymmetric digital subscriber line (ADSL) modem, an integrated services digital network (ISDN) modem, a cable modem or some other type of modem.

Depicted system 200 may have other wired connections. For example, codec 109 may connect to display 101, camera 104 and sound system 161 by cables 250. In some embodiments (e.g., in depicted videoconferencing system 200), the computer system 140 may connect to codec 109 in a wide variety of fashions. For example, the computer system 140 and codec 109 may both reside on the same network (e.g., a local area network (LAN), a wide area network (WAN)) and may communicate with each other across the network. The network may a wireless network, for example, a wireless network conforming to an Institute of Electrical and Electronic Engineers (IEEE) wireless standard (e.g., IEEE 802.11x, such as 802.11g or 802.11n). Codec 109 and PC 140 may reside on an IEEE 802.3 "Ethernet" network and wired connections may be made, for example, by co-axial cable, twisted pair or optical fiber. The network may support various protocols including, for example, transmission control protocol/internet protocol (TCP/IP). PC 140 and codec 109 may connect by other means (e.g., a Bluetooth wireless connection, a direct wired connection).

The computer system 140 and codec 109 may be connected, across a network, in a variety of ways. For example, the computer system 140 and codec 109 may form an ad-hoc wireless network and communicate with each other directly. Wireless router 220, if configured to operate in infrastructure mode may connect to the computer system 140 wirelessly and may also connect to codec 109 wirelessly, thus connecting the computer system 140 and codec 109 together. Wireless/wired router 220, may, for example, connect to the computer system 140 by a wired connection or by a wireless connection and router 220 may, for example, connect to codec 109 by a wired connection or by a wireless connection. Thus, the computer system 140 and codec 109 may be connected by a combination of wired and wireless connections and they may be connected through router 220.

In further embodiments, the computer system 140 and the codec 109 may be coupled in other manners or according to other protocols. For example, in one embodiment, the code 109 may coupled to the computer system 140 via a Bluetooth or IR connection, although other types of connections are possible.

In some embodiments, codec 109 may have fewer decoders (e.g., decoder blocks, decoder functions, decoder hardware or integrated circuits) than there are videoconferencing streams available for decoding. In one embodiment, codec 109 may have a single decoder and two or more videoconferencing streams may be received at codec 109 (e.g., one corresponding to a camera and another corresponding to a data presentation). Codec 109 may include some circuitry (e.g., digital circuitry and/or analog circuitry) that may be able to select (e.g., select based on input from a videoconference participant, such as from a human interface device) a videoconference stream from a number of available videoconference streams. The circuitry may resemble a multiplexor and may be able to route the selected videoconferencing stream to the single decoder. The decoder may be configured to handle changes (e.g., infrequent changes, rapid changes, intermittent changes) in the selection of the videoconferencing stream. Based on user input (e.g., local videoconference participant input, remote videoconference participant input, stream provider input, stream consumer input), codec 109 may, via internal circuitry, route a selected videoconference stream to a decoder (e.g., single decoder) within codec 109 for decoding and output.

The selection, by a user, of a videoconferencing stream for decode, may be performed in a wide variety of ways. For example, a user (e.g., videoconference participant 114) may depress one or more keys on a keyboard (e.g., the keyboard of the computer system 140, videoconferencing system keyboard) where the depressed keys correspond to a desired videoconferencing stream. Similarly, a user may depress one or more buttons on a handheld device (e.g., remote control device 150, a portable digital assistant (PDA), cell phone in communication with the codec 109) where the depressed buttons correspond to a desired videoconferencing stream. Furthermore, a user may use a pointing device (e.g., a mouse, a remote control pointing device, a tracker ball, a touch pad) to select a displayed item (e.g., an item on the display of computer system 140, an item on videoconferencing screen display 101) where the displayed item corresponds to a desired videoconferencing stream.

Videoconference stream selection assistance may be provided in a variety of ways. For example, a selection guide be provided, for example, on the screen of the computer system 140, on videoconferencing display 101, on remote control device 150, etc. The selection guide may take a variety of forms and may include, for example, one or more lists, a menu (hierarchical or flat), one or more display items (e.g., icons, regions), one or more illuminated buttons, one or more illuminated keys, one or more audible messages). In some embodiments, a selection may be made using a displayed selection guide by, for example, using a pointing device to select a displayed item and/or a displayed region in the selection guide. In certain embodiments, selecting a videoconference stream for decoding may also include selecting a videoconferencing stream for which decoding is to stop. In this manner, a user may select which stream currently being decoded may be changed or switched so that a stream that is not currently being decoded may now be decoded.

Figure 3A:
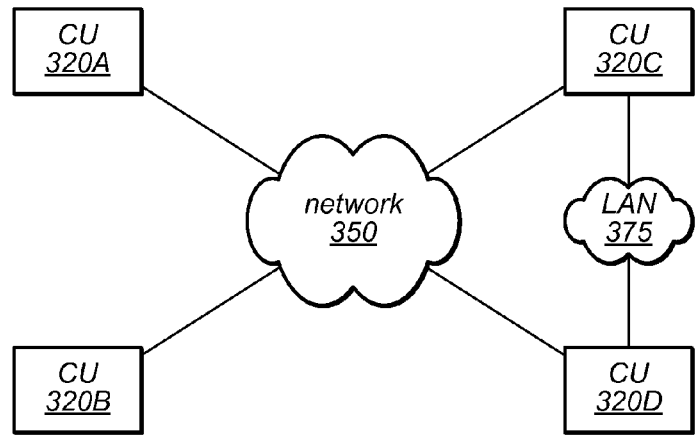
FIGS. 3A and 3B illustrate exemplary conferencing systems coupled in different configurations, according to some embodiments.
Figure 3B:
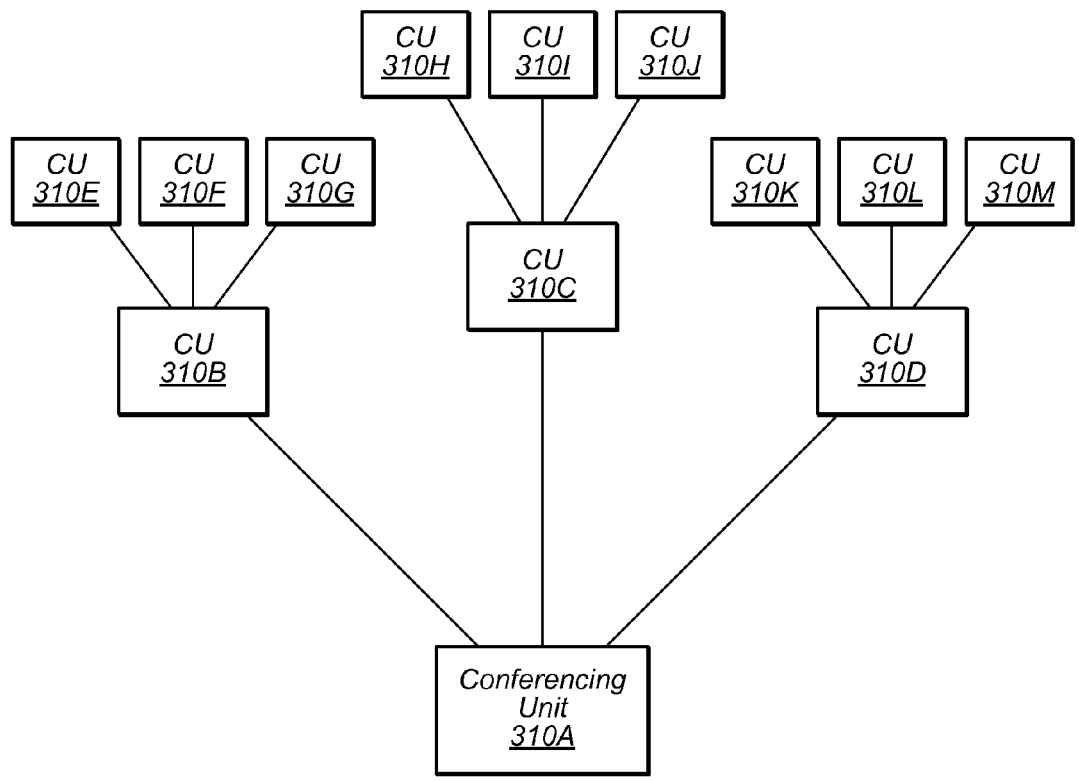

FIGS. 3A and 3B—Exemplary Conferencing Configurations

FIGS. 3A and 3B illustrate different configurations of conferencing systems. The conferencing systems may be operable to perform the methods described herein. As shown in FIG. 3A, conferencing systems (CUs) 320A-D (e.g., videoconferencing systems 103 described above) may be connected via network 350 (e.g., a wide area network such as the Internet) and CU 320C and 320D may be coupled over a local area network (LAN) 375. The networks may be any type of network (e.g., wired or wireless) as desired.

FIG. 3B illustrates a relationship view of conferencing systems 310A-310M. As shown, conferencing system 310A may be aware of CU 310B-310D, each of which may be aware of further CU's (310E-310G, 310H-310J, and 310K-310M respectively). CU 310A may be operable to perform the methods described herein. In a similar manner, each of the other CUs shown in FIG. 3B, such as CU 310H, may be able to perform the methods described herein, as described in more detail below. Similar remarks apply to CUs 320A-D in FIG. 3A.

Figure 4:
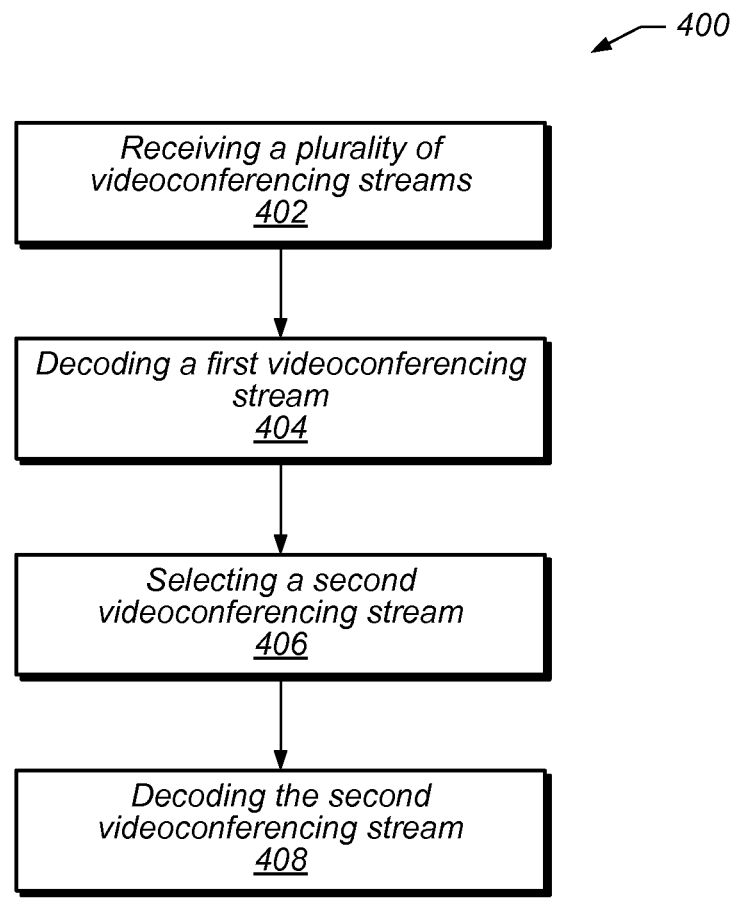
FIG. 4 is a flowchart diagram illustrating an exemplary method for supporting multiple videoconferencing streams in a videoconference, according to one or more embodiments.

FIG. 4—Supporting Multiple Videoconferencing Streams in a Videoconference

FIG. 4 depicts a method (e.g., method 400) of for supporting multiple videoconferencing streams in a videoconference, according to one or more embodiments. The method shown in FIG. 4 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 402, a plurality of videoconferencing streams may be received. In some embodiments, the videoconferencing streams may be received at a videoconferencing system unit (e.g., a codec) and the streams may be transmitted from various sources. For example, in certain embodiments, a stream may be transmitted from a source in the local videoconferencing participant location (e.g., a local computer system, a local camera). Similarly, in certain embodiments, a stream may be transmitted from a source in a remote videoconferencing participant location (e.g., a remote computer system, a remote camera). Streams may be transmitted across various types of communication links including, for example, wired and/or wireless networks, point-to-point links, intranets, extranets, the internet and combinations of the above listed and other types of links. The links may support a variety of transport protocols (e.g., TCP/IP) and the streams may conform to one or more videoconferencing standards (e.g., ITU-T H.320, H.323, H.324) and may conform to one or more media sharing standards (e.g., ITU-T. H.239). In some embodiments, receiving one or more videoconferencing streams may involve various tasks, including for example, stream identification, handshaking with a transmitting device, unpacking, decompression, decoding and buffering.

In 404, a first videoconferencing stream may be decoded. In some embodiments, the first videoconferencing stream may be a default stream or a previously selected stream. The first stream may be decoded by codec 109. More specifically, the first stream may be decoded by a decoder function that may be implemented in circuitry and/or software and may be implemented within codec 109. The decoder function may, for example, may capable of decoding a limited number of videoconferencing streams (e.g., one stream, one stream in real-time, two streams) and circuitry coupled to the decoder function may be capable (e.g., under user control) of routing a selected stream (e.g., of the first videoconferencing stream) to the decoder function so that the routed (e.g., selected, first) stream may be decoded. The decoded stream may then be displayed. Displaying may, for example, include displaying the first stream on a videoconference display, e.g., within a GUI window, such as in a videoconferencing application window).

In 406, a second videoconferencing stream may be selected. This selection process may include, for example, a user input from a local and/or a remote user. The user input may be provided using, for example, a keyboard, a keypad, a pointing device, and/or a remote control device, among others. The selection may be aided by a selection guide that may take the form of, for example, a menu presented on a display, a list presented on a display, one or more screen items, etc. The selection may be made by depressing a key, depressing a button or clicking on a displayed item, using a pointing device, etc. In certain embodiments, the selection process may include choosing a stream to be deselected (e.g., no longer decoded) and/or choosing a stream to be selected. In some embodiments (e.g., where there are a limited number of streams available for decoding, low cost systems), selecting may include pressing a button (or a key) to switch (e.g., toggle) between available streams. For example, in a videoconferencing system where three streams (e.g., A, B, C) are available for decoding and stream A is currently being decoded, pressing a select button once may select stream B for decoding and then pressing the select button two more times may cycle through each possibility to reselect stream A for decoding. In some embodiments, the process of selecting a videoconferencing stream may configure a decoder function to operate on a new (e.g., recently selected) stream and may configure circuitry coupled to the decoder function to route the selected stream to the decoder.

In some embodiments, stream selection may be made automatically (e.g., without explicit user input requesting to change the videoconferencing stream from a first stream to a second stream). For example, in some embodiments, a stream selection may be made automatically upon initial receipt of a stream. In one specific example, a first stream having video from a first videoconferencing location (e.g., video from a camera at the first location) may be received for a first period of time. Later, a participant at the first videoconferencing location may begin a data presentation and a second stream may begin to be received from the first videoconferencing location. Accordingly, the second stream may be automatically selected since it is a newly received stream. During this second period, the first stream may continue to be received, but may not be decoded since the second stream is begin decoded.

Prior to and after automatic selection, a user may be able to make additional selection choices. Selections may be made automatically based on a wide variety of criteria that may include, for example, one or more of the following: user preferences (e.g., audio is preferred over video), media type (e.g., still image, video, audio), media quality (e.g., image resolution), connection bandwidth (e.g., dropping a video stream if bandwidth is too low), transmission source (e.g., selecting a stream from a preferred source, or a newly detected source), stream content (e.g., Microsoft PowerPoint® is preferred to ASCII text), stream header data (e.g., meta-data) and ranking and/or rating information included in a stream, among other possibilities.

In 408, the second videoconferencing stream may be decoded. For example, the second stream may be decoded by codec 109. More specifically, the second stream may be decoded by a decoder function that may be implemented in circuitry and/or software and that may be implemented within codec 109. The decoder function may, for example, may capable of decoding a limited number of videoconferencing streams (e.g., one stream, one stream in real-time, two streams) and circuitry coupled to the decoder function may be capable (e.g., under user control) of routing a selected stream (e.g., the second videoconferencing stream) to the decoder function so that the routed (e.g., selected, second) stream may be decoded. The decoded stream (e.g., the decoded second stream) may then be displayed. Similar to above, displaying may include, for example, displaying the second stream on a videoconference display or computer system screen, among other possibilities.

Further Embodiments

In the methods described above, the videoconferencing system (e.g., unit) may only include a single decoder for decoding videoconferencing streams. Thus, the decoder may be used to decode a first stream and then in response to user input selecting a second stream, the same decoder may be used to decode a second stream. Alternatively, the videoconferencing system may include a plurality of decoders, but the same decoder may be used selectively to switch between the first and second streams (e.g., while other decoders are used for other purposes). By decreasing the required number of decoders, the cost of the videoconferencing system may be decreased.

In further embodiments, a single decoder may be time multiplexed to decode two separate streams, e.g., in a real time fashion. Thus, it may be possible for a single decoder to be used to decode the first and second streams at the same time. In some embodiments, priority may be provided to one of the streams, e.g., in response to a selection similar to that described above.

Embodiments of a subset or all (and portions or all) of the above may be implemented by program instructions stored in a memory medium or carrier medium and executed by a processor. A memory medium may include any of various types of memory devices or storage devices. The term "memory medium" is intended to include an installation medium, e.g., a Compact Disc Read Only Memory (CD-ROM), floppy disks, or tape device; a computer system memory or random access memory such as Dynamic Random Access Memory (DRAM), Double Data Rate Random Access Memory (DDR RAM), Static Random Access Memory (SRAM), Extended Data Out Random Access Memory (EDO RAM), Rambus Random Access Memory (RAM), etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The term "memory medium" may include two or more memory mediums that may reside in different locations, e.g., in different computers that are connected over a network.

In some embodiments, a computer system at a respective participant location may include a memory medium(s) on which one or more computer programs or software components according to one embodiment of the present invention may be stored. For example, the memory medium may store one or more programs that are executable to perform the methods described herein. The memory medium may also store operating system software, as well as other software for operation of the computer system.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

We claim:

1. A method for videoconferencing supporting a plurality of videoconferencing streams, the method comprising:
   in a videoconferencing device having a single decoder, utilizing the videoconferencing device to perform:
      receiving the plurality of videoconferencing streams at the videoconferencing device;
      providing a first videoconferencing stream of the received plurality of videoconferencing streams to a single decoder of the videoconferencing device;
      decoding, by the single decoder, the first videoconferencing stream in response to said providing the first videoconferencing stream to the single decoder, wherein the single decoder decodes not more than one videoconferencing stream at a time;
      receiving user input selecting, for decoding, a second videoconferencing stream of the received plurality of video conferencing streams, wherein the second videoconferencing stream is not the first videoconferencing stream;
      in response to said user input, providing the second videoconferencing stream of the received plurality of videoconferencing streams to the single decoder in place of the first videoconferencing stream; and
      decoding, by the single decoder, the second videoconferencing stream of the received plurality of videoconferencing streams in response to said providing the second videoconferencing stream to the single decoder.

2. The method of claim 1, wherein the method further comprises:
   displaying the first videoconferencing stream prior to said selecting; and
   displaying the second videoconferencing stream after said selecting.

3. The method of claim 1, wherein the user input is received via one of:
   a remote control device;
   a computer;
   a videoconferencing keyboard;
   a keypad device;
   a mobile device; or
   a pointing device.

4. The method of claim 1, wherein the method further comprises displaying videoconferencing stream decoding options.

5. The method of claim 4, wherein said displaying videoconferencing stream decoding options comprises one of:
   displaying videoconferencing stream decoding options on a handheld device;
   displaying videoconferencing stream decoding options on a computer screen; and
   displaying videoconferencing stream decoding options on a videoconferencing display.

6. A videoconferencing device for supporting a plurality of videoconferencing streams, comprising:
   one or more videoconferencing inputs, wherein at least one of the videoconferencing inputs is configured to receive a plurality of videoconferencing streams over a network;
   a single decoder for decoding a single videoconferencing stream of the plurality of videoconferencing streams, wherein the decoder is coupled to the one or more inputs;
   one or more outputs, wherein at least one of the outputs is configured to output a decoded videoconferencing stream, wherein the one or more outputs are coupled to the decoder;
   one or more user input devices; and
   at least one processor configured to:
      provide a first videoconferencing stream of the received plurality of videoconferencing streams to the decoder to be decoded;
      receive user input via the one or more user input devices selecting, for decoding, a second videoconferencing stream of the received plurality of videoconferencing streams, wherein the second videoconferencing stream is not the first videoconferencing stream; and
      in response to said user input, provide the second videoconferencing stream to the single decoder to be decoded in place of the first videoconferencing stream.

7. The videoconferencing device of claim 6, wherein the at least one output is coupled to a display, wherein the display is configured to display the first videoconferencing stream prior to said selecting and display the second videoconferencing stream after said selecting.

8. The videoconferencing device of claim 7, wherein the one or more user input devices comprise at least one of:
   a remote control device;
   a computer;
   a videoconferencing keyboard;
   a keypad device;
   a mobile device; or
   a pointing device.

9. The videoconferencing device of claim 6, wherein the videoconferencing device is further configured to provide a plurality of videoconferencing stream decoding options via an output of the one or more outputs of the videoconferencing device.

10. The videoconferencing device of claim 9, wherein the plurality of videoconferencing stream decoding options is provided for display by:
    a handheld device;
    a computer screen; or
    a videoconferencing display of the videoconferencing device.

11. A non-transitory, computer accessible memory medium storing program instructions executable by a processor of a videoconferencing device to:
    receive a plurality of videoconferencing streams;
    provide a first videoconferencing stream of the received plurality of videoconferencing streams to a single decoder coupled to the processor, wherein the decoder is configured to decode the provided videoconferencing stream, and wherein the decoder decodes not more than one videoconferencing stream at a time;
    receive user input selecting, for decoding, a second videoconferencing stream of the received plurality of videoconferencing streams, wherein the second videoconferencing stream is not the first videoconferencing stream; and
    provide, in response to said user input, the second videoconferencing stream to the single decoder in place of the first videoconferencing stream.

12. The memory medium of claim 11, wherein the program instructions are further executable by the processor to:
    display the first videoconferencing stream prior to said selecting; and
    display the second videoconferencing stream after said selecting.

13. The memory medium of claim 11, wherein the user input is received via one of:
    a remote control device;
    a computer;
    a videoconferencing keyboard;

a keypad device;

a mobile device; or a pointing device.

14. The memory medium of claim 11, wherein the program instructions are further executable by the processor to display videoconferencing stream decoding options.

15. The memory medium of claim 14, wherein said displaying videoconferencing stream decoding options comprises one of:

displaying videoconferencing stream decoding options on a handheld device;

displaying videoconferencing stream decoding options on a computer screen; and displaying videoconferencing stream decoding options on a videoconferencing display.

\* \* \* \* \*